United States Patent
Morovic et al.

(10) Patent No.: US 10,479,121 B2
(45) Date of Patent: Nov. 19, 2019

(54) PROCESSING AN OBJECT FOR PRINTING

(71) Applicant: Hewlett-Packard Development Company, L.P., Houston, TX (US)

(72) Inventors: Jan Morovic, Colchester (GB); Peter Morovic, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 15/546,216

(22) PCT Filed: Jan. 29, 2015

(86) PCT No.: PCT/EP2015/051833
§ 371 (c)(1),
(2) Date: Jul. 25, 2017

(87) PCT Pub. No.: WO2016/119860
PCT Pub. Date: Aug. 4, 2016

(65) Prior Publication Data
US 2018/0001681 A1    Jan. 4, 2018

(51) Int. Cl.
| | |
|---|---|
| B41J 29/38 | (2006.01) |
| B29C 64/393 | (2017.01) |
| B33Y 50/02 | (2015.01) |
| H04N 1/60 | (2006.01) |

(Continued)

(52) U.S. Cl.
CPC ............ *B41J 29/38* (2013.01); *B29C 64/393* (2017.08); *B33Y 50/00* (2014.12); *B33Y 50/02* (2014.12); *G06F 3/1208* (2013.01); *G06F 3/1247* (2013.01); *H04N 1/60* (2013.01); *H04N 1/6022* (2013.01); *G06F 3/1205* (2013.01); *G06F 3/1254* (2013.01); *H04N 2201/0082* (2013.01)

(58) Field of Classification Search
CPC ......... B41J 29/38; H04N 1/60; H04N 1/6008; H04N 1/605; H04N 1/6058; H04N 2201/0082; B29C 64/393; B33Y 50/02
See application file for complete search history.

(56) References Cited

U.S. PATENT DOCUMENTS

| | | | |
|---|---|---|---|
| 7,501,727 B2 * | 3/2009 | Miyaji | H02K 19/365 310/51 |
| 7,787,702 B2 * | 8/2010 | Brown | G06T 5/009 345/589 |
| 7,991,498 B2 | 8/2011 | Kritchman | |

(Continued)

OTHER PUBLICATIONS

"A disruptive 3D printing technology for a new era of manufacturing", Technical white paper, HP Multi Jet Fusion™ technology, Hewlett-Packard Development Co. L.P. 2014 8pgs.

(Continued)

*Primary Examiner* — Anh T Vo
(74) *Attorney, Agent, or Firm* — HP Inc. Patent Department

(57) ABSTRACT

A method for processing an object for printing, the object comprising a plurality of properties defined at each of a plurality of locations within the object, each property represented by a metamer set of possible combinations of proportions of at least one of a set of printing materials, the method comprising: selecting a combination of the metamer sets of a given location within an object that provides all of the plurality of properties defined for the given location.

15 Claims, 3 Drawing Sheets

(51) Int. Cl.
*G06F 3/12* (2006.01)
*B33Y 50/00* (2015.01)

(56) References Cited

U.S. PATENT DOCUMENTS

| | | | |
|---|---|---|---|
| 9,313,360 B2* | 4/2016 | Morovic | H04N 1/32309 |
| 2010/0142003 A1* | 6/2010 | Braun | H04N 1/32309 |
| | | | 358/3.28 |
| 2012/0053716 A1 | 3/2012 | Bickel et al. | |
| 2012/0243009 A1 | 9/2012 | Chapman et al. | |
| 2014/0070461 A1 | 3/2014 | Pax | |
| 2014/0131908 A1 | 5/2014 | Sun et al. | |
| 2014/0134334 A1 | 5/2014 | Pridoehl et al. | |
| 2014/0257549 A1 | 9/2014 | Swartz | |
| 2014/0279177 A1 | 9/2014 | Stump | |

OTHER PUBLICATIONS

International Search Report and Written Opinion for International Application No. PCT/EP2015/051833 dated Nov. 12, 2015, 9 pages.

* cited by examiner

SELECT MATERIAL COMBINATION AT A GIVEN LOCATION — 201

PROCESSING AN OBJECT FOR PRINTING

BACKGROUND

An object to be printed may be processed to provide the control data for printing the object which includes data to control the amount of printing material to deposit at a given location or the object may be processed as to its fitness for printing purposes. The amount of printing material to be deposited at any one location on a medium, during the printing process, is determined by the properties of the object being printed at that location, for example, color, opacity, rigidity, flexibility, conductivity, magnetism, porosity which would be produced at a given location based on the combination of the medium and printing materials. If amounts of printing material cannot be determined for the properties at any one location, the object may be considered unfit for printing purposes.

BRIEF DESCRIPTION OF DRAWINGS

For a more complete understanding, reference is now made to the following description taken in conjunction with the accompanying drawings in which.

DETAILED DESCRIPTION

Figures 1, 2:
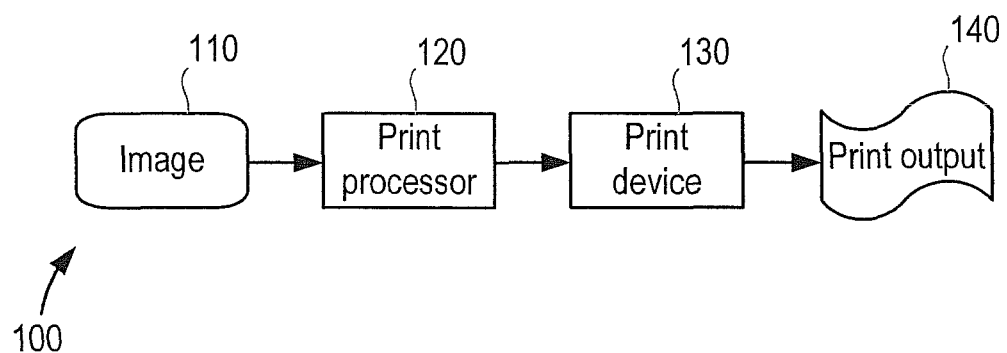
FIG. 1 is a simplified schematic of an example of a printing system.
FIG. 2 is a flowchart of an example of a method for processing an object for printing.

FIG. 1 shows an example of a printing system 100 that may be used with the methods described herein. The printing system 100 produces a print output of a printed object. The printed object may be in the form of 2D printed image or a 3D object. In the example of FIG. 1, input image data corresponding to an image 110 is sent to a print processor 120.

The input image data of a 2D image to be printed includes property data, such as color and/or opacity, of an element of the 2D image, each element at a specific location within the 2D image.

The examples described herein apply to printing on a medium such as paper, fabric, plastic or any other suitable print medium with printing fluids containing color pigments, e.g. colored inks to provide different properties at a given location with respect to color to produce a 2D print of an image. However, in addition, other printing fluids may be used to alter the appearance (property at a given location) of a 2D printed output without color pigmentation, e.g. through the application of gloss or the like, or to provide treatment of the substrate printing fluids, e.g. fixers or the like.

The input image data of a 3D object to be generated may be in the form of a representation of a 3D object model of the 3D object to be generated. The print processor 120 processes the image data. The print processor 120 then outputs print control data that is communicated to a printing device 130. The printing device 130 generates a print output 140 as instructed by the print control data.

The examples described herein also apply to generating 3D objects. In one example, a 3D object is generated by a printing device 130 layer-by-layer to build up the final 3D object. This may be achieved by additive manufacturing techniques where a 3D object is generated through the solidification of a build material. The build material may be powder-based and the properties of generated objects may depend on the type of build material and the type of solidification mechanism used. In a number of examples of such techniques including sintering techniques, build material is supplied in a layer-wise manner and material or a combination of materials are deposited onto selected regions of the build material. Energy may be applied to the layers of build material to cause melting in the selected regions to cause coalescence or solidification. In other techniques, chemical solidification methods may be used.

In the generation of a 3D object, in addition to input of object model data, object property data is also input to define the property of the generated 3D object. The input object model data and the object property data may be processed in slices of parallel planes of the model or in another example the input object model data and the object property data may be processed in 3D space and then sliced to generate the control data to define selected regions of each layer of the 3D object being generated. Each slice may define a portion of a respective layer of build material that is to be solidified or caused to coalesce by the additive manufacturing system.

The printing material(s) deposited in selected regions of the build material in the generation of 3D objects or depositing of a printing fluid(s) on a medium in the printing of a 2D image introduce a challenge in managing multiple material properties that may also conflict. For example, when printing using coloured materials, each of which have their respective opacity, certain color-opacity combinations may be impossible to achieve in the printed output, whilst being specifiable in the input. In another example, the object property data may specify multiple material properties for its constituent parts, such as color, rigidity/flexibility, conductivity, magnetism, opacity, porosity, etc. However, since the printing materials that are used in printing of 2D images or in producing the 3D object each have their specific combination of material properties, certain combinations may be impossible to enact.

3D printing, such as additive manufacturing systems described above, for example, with multiple materials involves manual choices about their use, which is suitable for the use of 3D printing technology as a tool in a hand-crafting process, but not as a machine for commercial or industrial mass production.

In the printing of a 2D image, Halftone Area Neugebauer Separation (HANS) techniques may be used to generate control data for controlling the printing device 130. The properties at a given location are mapped to printing material area coverages which define the possible combinations of proportions of a set of printing material. For example, when the property at a given location is a green color, the printing material area coverage defines the combination as some proportion of the area at the given location using yellow ink and another proportion of the area using cyan ink.

In the generation of a 3D object, 3D Halftone Area Neugebauer Separation (HANS) techniques may be used to generate the control data for controlling the printing device. The material properties of a part of an input object model (the object property data) are mapped to printing material volume coverages which define the object property data of the part of the object model as proportions of available object properties (materials). For example, when a green color is needed, some proportion of the printed volume will use yellow ink while another proportion will use cyan ink while yet another proportion will use both yellow and cyan ink simultaneously.

However, while if all is needed is variation in a single material property (for example, color), current approaches used in 2D printing (such as the gamut mapping employed in color management) are well suited. However, when multiple material properties need to be dealt with simultaneously, the example of the method FIG. 2 may be employed.

The object to be processed for printing comprises a plurality of properties defined at each of a plurality of locations within the object, each property represented by a metamer set of possible combinations of proportions of at least one of a set of printing materials. A combination of proportions of at least one of a set of printing materials for a given location within an object that provides all of the plurality of properties defined for the given location is selected, 201. In one example, the control data to print the object from the selected combination at the given location is generated. In another example, the processing of the object may be used to establish the object's fitness for printing.

Figure 3:
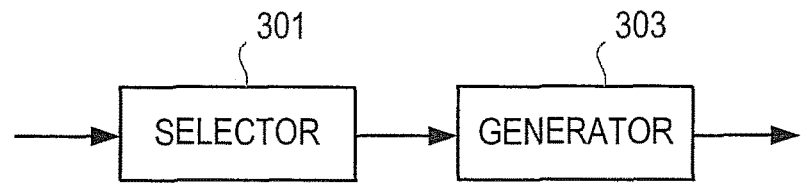
FIG. 3 is a simplified schematic of an example of apparatus for processing an object for printing.

An example of apparatus for processing an object for printing is shown in FIG. 3. In one example, the apparatus is an integral part of the print processor of 120 of FIG. 1. An input image 110, for example, 2D image data defining a plurality of properties at each location of the 2D image to be printed, for example, data defining the color value in an input color space (for example RGB color space) of a pixel and the opacity of the pixel at a given location of a 2D array of pixels of the 2D image to be printed is input into the selector 301. In another example, the input of the selector 301 comprises object property data defining a plurality of properties of each voxel of a 3D object to be generated (printed), for example, color, rigidity, flexibility, conductivity, magnetism, opacity, porosity, etc. Each voxel may represent a pixel at each location of a 3D array of a 3D bit map representation of the 3D object to be generated.

Each of the plurality of properties defined at each location of the input is represented by a metamer set of possible combinations of proportions of at least one set of printing materials. In one example a metamer set is a set of surfaces whose color matches under one set of conditions, but which can have differences in the underlying material properties. The metamer sets may be extended to any material property. For example, the metamer sets may comprise a color metamer set—i.e., the set of all printing material combinations (for example, material combination volume coverages (Mvocs) of a 3D object, that define the probability distribution of materials at a voxel location or NPacs—Neugebauer Primary area coverages of a 2D object that match a given color), an opacity metamer set—i.e., the set of all printing material combinations that match a given level of opacity, etc.

The selector 301 outputs the selected combination of proportions of at least one of a set of printing materials for each location of the input object which provides all of the specified plurality of properties for each location. The output of the selector 301 is provided to a generator 303 which, in one example, generates the control data for the printing device 130 to provide the proportions of at least of a set of printing material at a given location based on the selected combination and, in another example, generates a report of the object's fitness for the purposes of printing.

Figure 4:
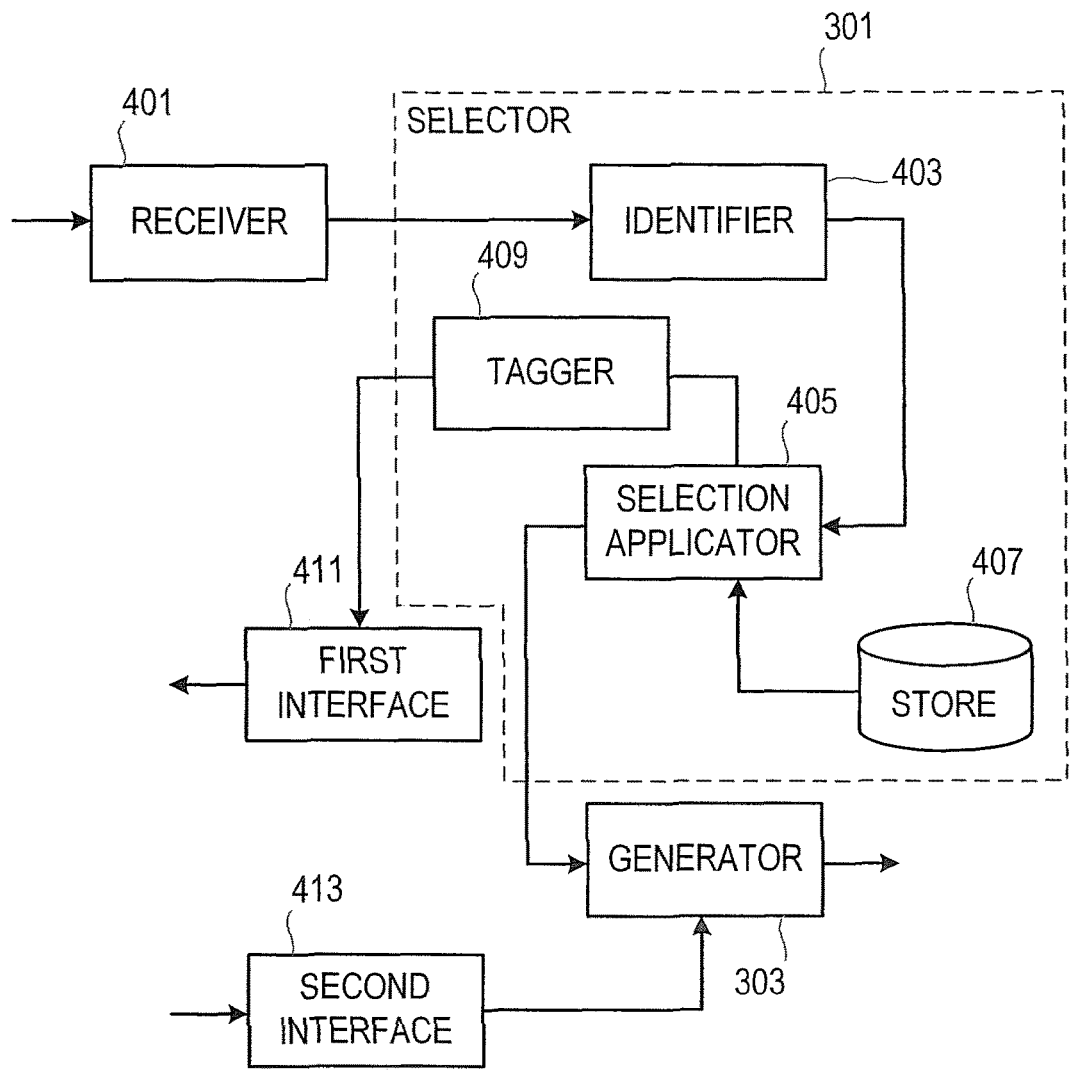
FIG. 4 is a simplified schematic of the example of apparatus for processing an object for printing.
Figure 5:
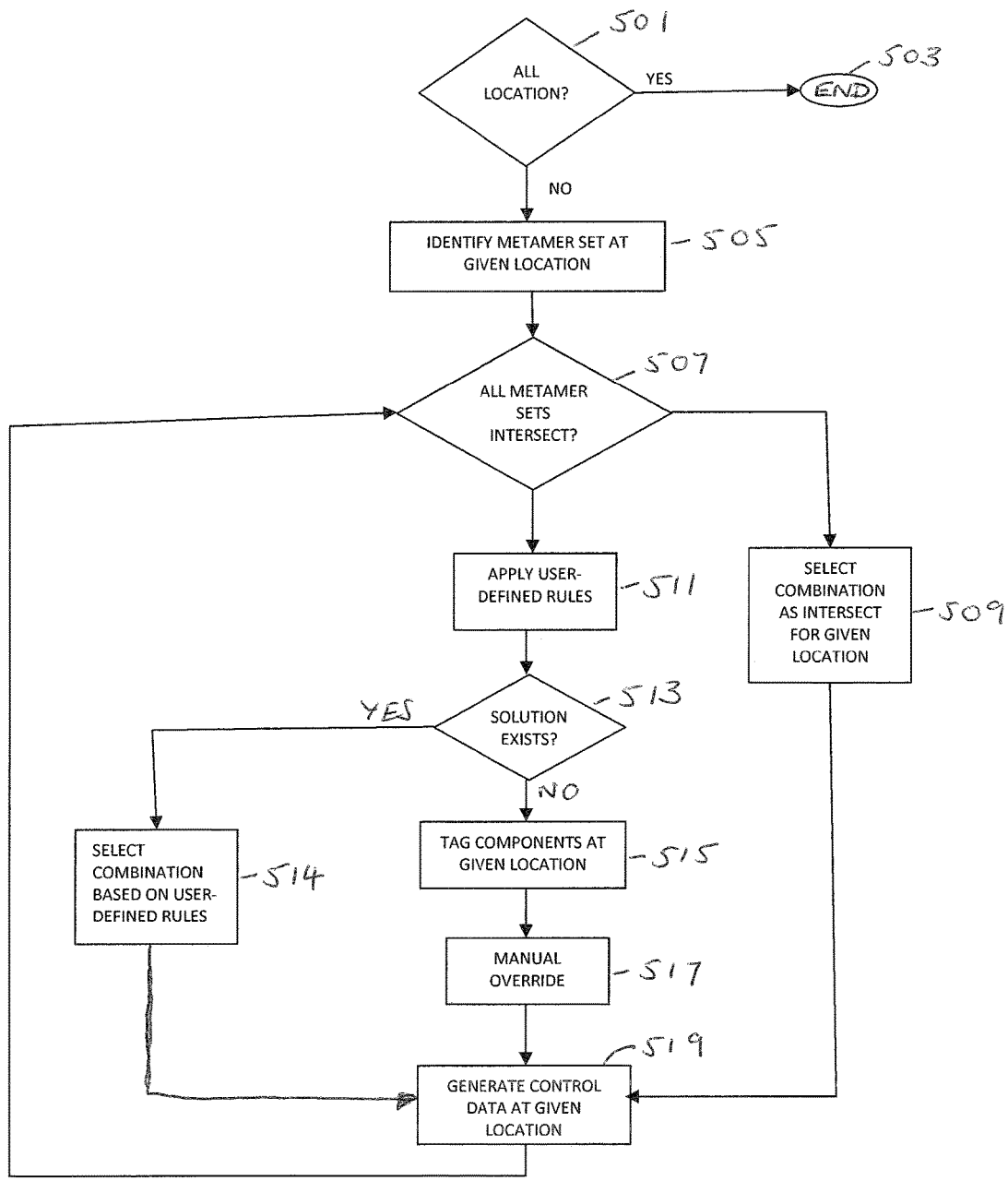
FIG. 5 is a flowchart of the example of a method for processing an object for printing.

As shown in FIG. 4, the object may be processed to generate print control data to control the printing of an object. An input object is received by a receiver 401. The output of the receiver 401 is connected to the input of an identifier 403 of the selector 301. The output of the identifier is connected to the input of a selection applicator 405 of the selector 301. The selection applicator 405 also has access to the content of a store 407. The selection applicator 405 provides output to a tagger 409 of the selector 301 and output to the generator 303. The tagger 409 of the selector 301 is connected to the output of a first interface 411 and the generator has a second input connected to the output of a second interface 413. In operation, as shown in FIG. 5, the metamer sets for a given location of each location 501 of an input of the receiver 401 is identified, 505, by the identifier 403. In one example, identifying such metamer sets may involve the same mechanisms as underlie the original, 2D, variant of HANS. For example, build a model that, given printing material combinations predicts some property in the resulting print. In one example, this may be achieved from Neugebauer Primary area coverages (NPacs), from which it is possible to predict color, grain, color inconstancy, ink use, etc. Next, set up a binning of color space (e.g., CIE XYZ, or Yule-Nielsen-corrected XYZ, CIE LAB), where some range in that space is sub-divided into cuboids or cells. The Neugebauer Primary (NP) area coverage space (e.g., by randomly selecting a random number of NPs and then assigning random area coverages to these NPs so that these area coverages add up to 1. Then for each sampled NPac, the model as described above is used to predict color and any other properties that may be of interest. Each sampled NPac in the bin that contains its color is stored. The result is sets of NPacs per color-bin, where all the NPacs in a color-bin are near-metamers. Given such near-metamer sets in terms of color, it is then possible to choose from among their members.

Once such metamer sets are identified, 505, the selection applicator 405 selects, 509, a combination of printing materials that has all the specified properties of the given location, for example, both the specified color and the specified opacity, for example, involves finding the intersection of the identified metamer sets, 507, for example, the intersection of a color metamer set with an opacity metamer set.

However, if there is no intersection between each of the identified metamer sets, user-defined rules for the identified metamer sets at the given location are retrieved by the selection applicator 405 from the store 407.

The selection applicator 405 applies, 511 the user-defined rules retrieved from the store 407. In one example, the user-defined rules are in the form of a list of priorities (for example, opacity has a higher priority than color, so in applying these rules, the combination of the color metamer set and opacity metamer set that provides the closest color at the specified opacity is selected, 514. In another example, the user-defined rules are in the form of weights (for example, preserve color with twice as much accuracy as opacity). In yet another example, the user-defined rules are in the form of tolerances, for example, allow no more than 5 ΔE color change (color difference no greater than 5) when applying rules or any combination thereof.

However, even with such rules, there isn't always a solution, and if there is no solution to the user-defined rules, a manual override is initiated, 515, 517. The components of the 3D object whose multiple properties at the given location that cannot be resolved are tagged, 515, by the tagger 409 and delivered to the first interface 411 to be presented to the user for direct, manual override. The user may have the option of changing the input to the process. The changed inputs can be reassessed by the process of blocks 505 to 517 of FIG. 5 in an attempt to arrive at a feasible combination of properties, or the user may have the option of terminating the printing request. The process is reported for all locations, 501, and then the process ends, 503.

In another example (not shown in the Figure), if there is no solution to the user-defined rules, the input is reported to the user unfit for printing purposes.

The above examples may be utilised in the printing process as described above from input object to halftoned images or slices. The above examples may also be utilised to analysis an input object to generate a report of its fitness for printing. The examples above may be integrated into an application where the object to be printed may be modified until it passes the material property checks 507 to 511.

As described herein material properties are managed providing both an optimisation and a process for setting predetermined orders of priority or allowing for manual intervention to resolve conflicts. It enables greater automation in the production of multi-property 2D and 3D printing, by managing conflicts between multiple properties and enables automatic analysis of multi-property 3D objects for their suitability for printing. It enables automatic resolution of material property conflicts and it enables intervention-free production of print jobs that have material property conflicts.

It should be noted that the above-mentioned examples illustrate rather than limit what is described herein, and that those skilled in the art will be able to design many alternative implementations without departing from the scope of the appended claims. The word "comprising" does not exclude the presence of elements other than those listed in a claim, "a" or "an" does not exclude a plurality, and a single processor or other unit may fulfil the functions of several units recited in the claims.

The invention claimed is:

1. A method for processing an object for printing, the object comprising a plurality of properties defined at each of a plurality of locations within the object, each property represented by a metamer set of possible combinations of proportions of at least one of a set of printing materials, the method comprising:
    selecting a combination of the metamer sets of a given location of the plurality of locations within the object that provides all of the plurality of properties defined for the given location.

2. The method of claim 1, wherein selecting a combination of the metamer sets of the given location comprises
    if no combination exists that provides all of the plurality of properties defined for the given location, applying user-defined rules associated with each of the metamer sets for the given location to select one of the combinations.

3. The method of claim 2, wherein selecting a combination of the metamer sets of the given location comprises
    if no solution to the applied user-defined rules exists, performing a manual override for the given location.

4. The method of claim 3, wherein performing a manual override comprises
    changing parameters of the object until another combination of metamer sets for the given location can be selected.

5. The method of claim 2, wherein the method further comprises
    if no solution to the applied user-defined rules exists, reporting the input object unfit for printing.

6. The method of claim 1, wherein the method further comprises
    generating control data for printing the object from the selected combination at the given location.

7. An apparatus for processing an object for printing, the object comprising a plurality of properties defined at each of a plurality of locations within the object each property represented by a metamer set of possible combinations of proportions of at least one of a set of printing materials, the apparatus comprising:
    a selector to select a combination of the metamer sets for a given location of the plurality of locations within the object that provides all of the plurality of properties defined for the given location.

8. The apparatus of claim 7, wherein the selector comprises
    an identifier to identify the metamer set for each property defined at the given location.

9. The apparatus of claim 8, wherein the selector further comprises
    a selection applicator to select one of the identified metamer sets for a given location within the object that provides all of the plurality of properties defined for the given location.

10. The apparatus of claim 8, wherein the apparatus further comprises a store to store a plurality of user-defined rules associated with each metamer set, the selection applicator is further to apply the user-defined rules associated with the metamer sets for the given location to select a metamer set for the given location if no metamer set exists that provides all of the plurality of properties defined for the given location.

11. The apparatus of claim 10, wherein the apparatus further comprises a tagger to tag the given location if no solution to the applied user-defined rules exists for enabling a manual override for the given location.

12. The apparatus of claim 11, wherein the apparatus further comprises a first interface to present the tagged location to a user for manual override.

13. The apparatus of claim 12, wherein the apparatus further comprises a second interface to input the manual override.

14. The apparatus of claim 10, wherein the apparatus further comprises
    a generator to generate a report that the input object is unfit for printing if no solution to the applied user-defined rules exists.

15. The apparatus of claim 7, wherein the apparatus further comprises a generator to generate control data for printing the object from the selected metamer set at the given location.

* * * * *